United States Patent [19]
Saruwatari et al.

[11] Patent Number: 5,979,418
[45] Date of Patent: Nov. 9, 1999

[54] APPARATUS FOR PROCESSING FUEL VAPOR IN INTERNAL COMBUSTION ENGINE EQUIPPED WITH SUPERCHARGER

[75] Inventors: Masayuki Saruwatari; Junichi Furuya, both of Atsugi, Japan

[73] Assignee: Unisia Jecs Corporation, Atsugi, Japan

[21] Appl. No.: 09/205,099

[22] Filed: Dec. 3, 1998

[30] Foreign Application Priority Data

Dec. 16, 1997 [JP] Japan ................................. 9-346583

[51] Int. Cl.⁶ .................................................. F02M 33/02
[52] U.S. Cl. ......................................... 123/519; 123/383
[58] Field of Search ............................... 129/520, 519, 129/518, 516, 521, 198 D, 383

[56] References Cited

U.S. PATENT DOCUMENTS

| | | | |
|---|---|---|---|
| 4,446,940 | 5/1984 | Sakakibara | 123/383 |
| 4,541,396 | 9/1985 | Sato | 123/383 |
| 5,103,794 | 4/1992 | Shiraishi | 123/520 |
| 5,183,023 | 2/1993 | Hanson | 123/519 |
| 5,377,644 | 1/1995 | Rohn | 123/520 |
| 5,390,645 | 2/1995 | Cook | 123/520 |
| 5,411,004 | 5/1995 | Busato | 123/520 |
| 5,474,047 | 12/1995 | Cochard | 123/520 |

FOREIGN PATENT DOCUMENTS 1-58760  4/1989  Japan .

*Primary Examiner*—Carl S. Miller
*Attorney, Agent, or Firm*—Foley & Lardner

[57] ABSTRACT

A three-way valve is mounted in the middle of a bypass passage bypassing the upstream and downstream of a compressor, and a purge passage is connected to the three-way valve. When the negative throttle pressure is equal to or above a predetermined value (close to vacuum), the recirculation of the supercharged pressure is performed through the bypass passage. On the other hand, when the negative throttle pressure is below the predetermined value, the purging of the canister is performed on the upstream side of the compressor through the bypass passage.

10 Claims, 4 Drawing Sheets

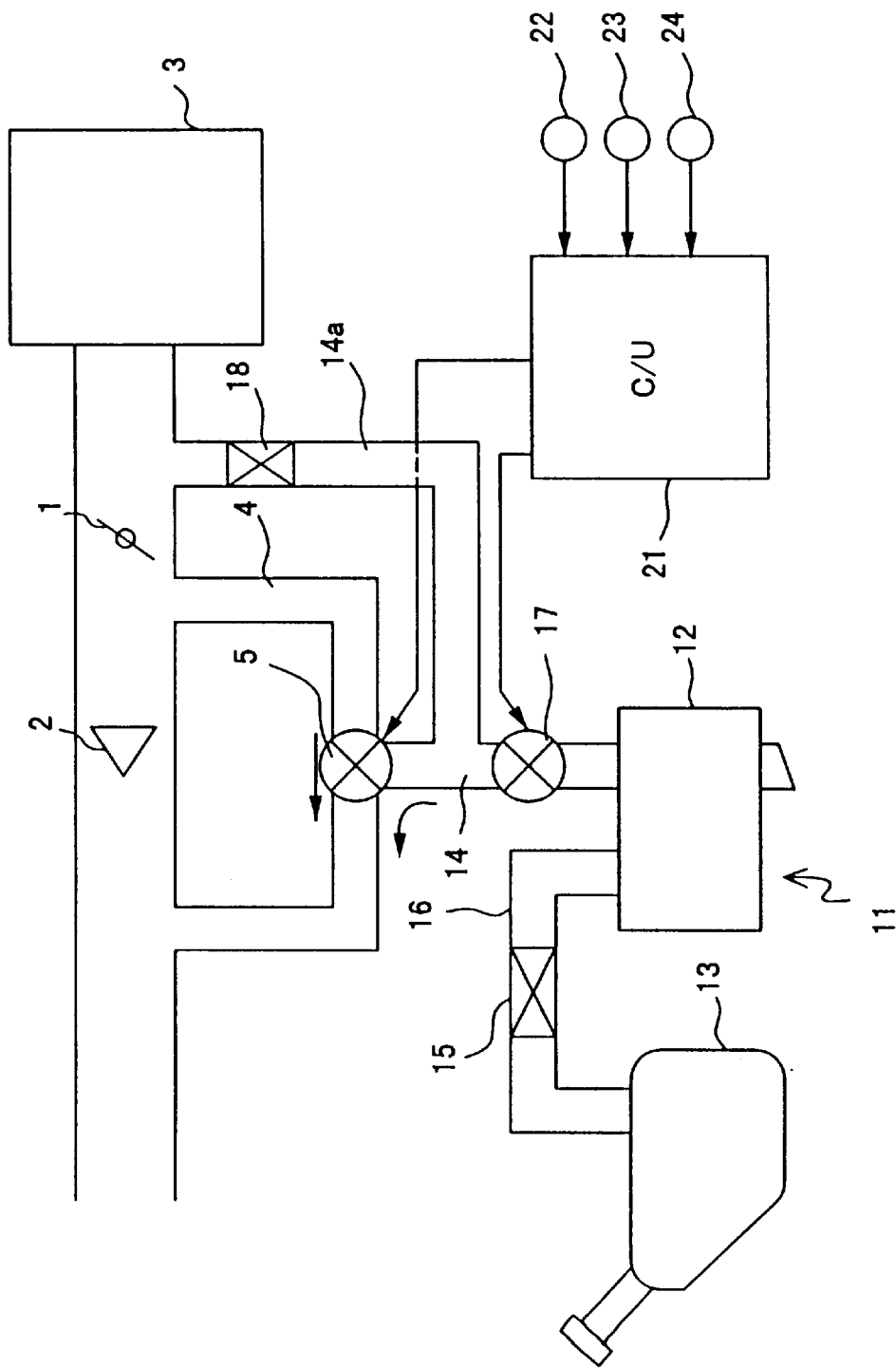

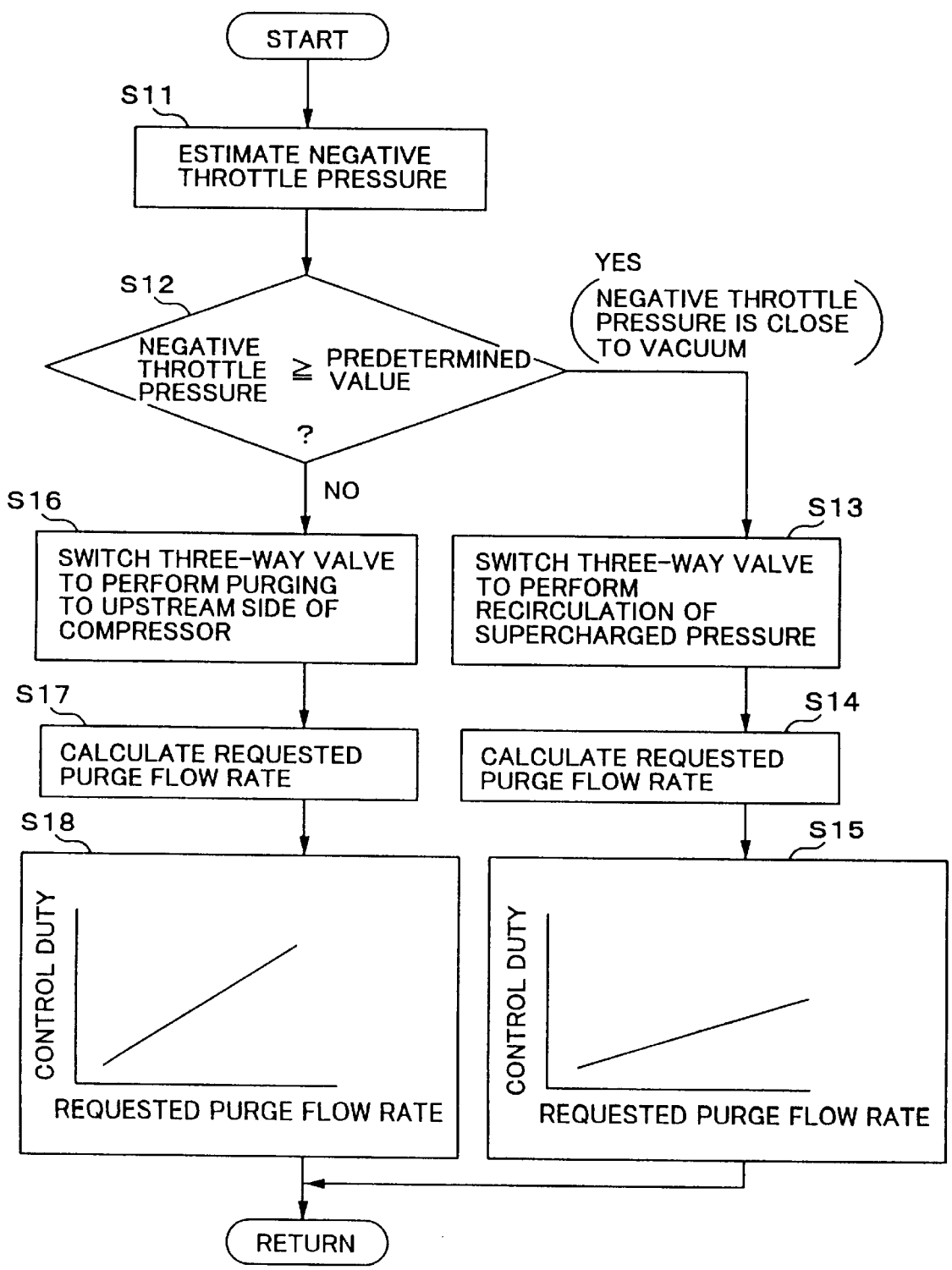

APPARATUS FOR PROCESSING FUEL VAPOR IN INTERNAL COMBUSTION ENGINE EQUIPPED WITH SUPERCHARGER

BACKGROUND OF THE INVENTION (1) Field of the Invention

The present invention relates to, in an internal combustion engine in which supercharging is performed by a supercharger equipped with a recirculation system, an apparatus for sucking fuel vapor generated in a fuel tank into the engine and combusting the same.

(2) Related Art of the Invention

A fuel vapor processing apparatus is conventionally known for adsorbing fuel vapor generated a fuel tank of a vehicle by a canister temporarily, and then sucking the fuel vapor removed from the canister into the engine for combustion (refer for example to Japanese Unexamined Utility Model Publication No. 1-58760).

Moreover, a recirculation system is known equipped in a turbocharger of an internal combustion engine for a vehicle wherein a bypass passage is mounted so as to communicate an intake passage on the upstream side and an intake passage on the downstream side of a compressor, and when the negative throttle pressure on the downstream side of the compressor becomes equal to or above a predetermined value (close to vacuum), a valve mounted on said bypass passage is opened, and the supercharged pressure on the downstream side of the compressor is recirculated to the upstream side thereof, so as to reduce the supercharged pressure.

Both the recirculation system of the supercharger and the fuel vapor processing apparatus use pipings connected to intake passages as components. However, in the prior art, the piping for the recirculation system and the piping for the fuel vapor processing apparatus were mounted individually, which lead to complex structure of the piping arrangement. Further, large numbers of components had to be used.

SUMMARY OF THE INVENTION

The present invention aims at solving the above problems, and the object of the invention is to simplify the piping structure for intake passages, by using a portion of the piping commonly by the fuel vapor processing apparatus and the recirculation system of the supercharger.

In order to achieve the object, the fuel vapor processing apparatus in the internal combustion engine equipped with a supercharger mounts a three-way valve on a bypass passage communicating the upstream and downstream of the compressor, and a purge passage of a canister is connected to said three-way valve, so that the three-way valve is enabled to be switched between the state communicating said bypass passage, and the state communicating said purge passage to the upstream side of said compressor through said bypass passage.

According to such a constitution, when the bypass passage is communicated by the switching of the three-way valve, the recirculation of the supercharged pressure is performed, and on the other hand, when the purge passage is communicated to the upstream side of the compressor, purged air may be supplied to the internal combustion engine. At such a state, the supply of the purged air to the engine is performed by using one portion of the bypass passage and the purge passage, so only the bypass passage will be connected directly to the engine.

Moreover, in the fuel vapor processing apparatus of the present invention, in addition to the above structure, a second purge passage is mounted which branches from the middle of said purge passage, and communicates to the downstream side of a negative pressure generation mechanism equipped on the downstream side of said compressor.

According to such a constitution, the purged air may be supplied to the engine using the negative pressure on the downstream side of the negative pressure generation mechanism to which the second purge passage is connected, while the recirculation of the supercharged pressure is performed through the bypass passage.

It is preferable to mount to the second purge passage a check valve allowing only the flow in the direction from said canister toward the downstream side of the negative pressure generation mechanism.

According to such a constitution, the generation of a reverse flow toward the canister may be prevented.

Moreover, a throttle valve may be equipped as the negative pressure generation mechanism.

According to such a constitution, the negative throttle pressure may be used to enable purging in the state where the recirculation of the supercharged pressure is performed. However, the negative pressure generation mechanism may be formed as a fixed throttle of a venturi and the like.

Moreover, the switching control of the three-way valve may preferably be performed so that the bypass passage communicates only when the recirculation of the supercharged pressure is requested.

According to such a constitution, the supercharged pressure may be controlled securely, and when there is no need to perform the recirculation of the supercharged pressure, the purging of the canister may be performed.

Here, the three-way valve may be operated to switch mechanically according to the intake air pressure, by utilizing the intake air pressure of the internal combustion engine as the driving source.

According to such a constitution, the three-way valve may be operated mechanically according to the level of the intake air pressure, so as to switch between a state where the recirculation of the supercharged pressure is performed and a state where the purging of the canister is performed.

Further, the three-way valve may be an electromagnetic-type three-way valve, wherein the valve is electronically controlled based on the data of the intake air pressure.

According to such a constitution, the intake air pressure may either be detected directly by an intake air pressure sensor, or be estimated from the driving condition of the engine, and based on the result of detection by the sensor or the result of estimation based on the driving condition, a control signal is output to the three-way valve, thereby switching the valve between the state where the recirculation of the supercharged pressure is performed, or the state where the purging of the canister is performed.

These and other objects and phases of the present invention may become apparent from the explanation on the embodiments regarding the drawings accompanied herewith.

BRIEF EXPLANATION OF THE DRAWINGS

FIG. 3 is a view showing the system structure of the internal combustion engine according to the second embodiment; and FIG. 4 is a flowchart showing the contents of control according to the second embodiment.

DETAILED DESCRIPTION OF THE PREFERRED EMBODIMENT

The preferred embodiment according to the present invention will now be explained.

Figure 1:
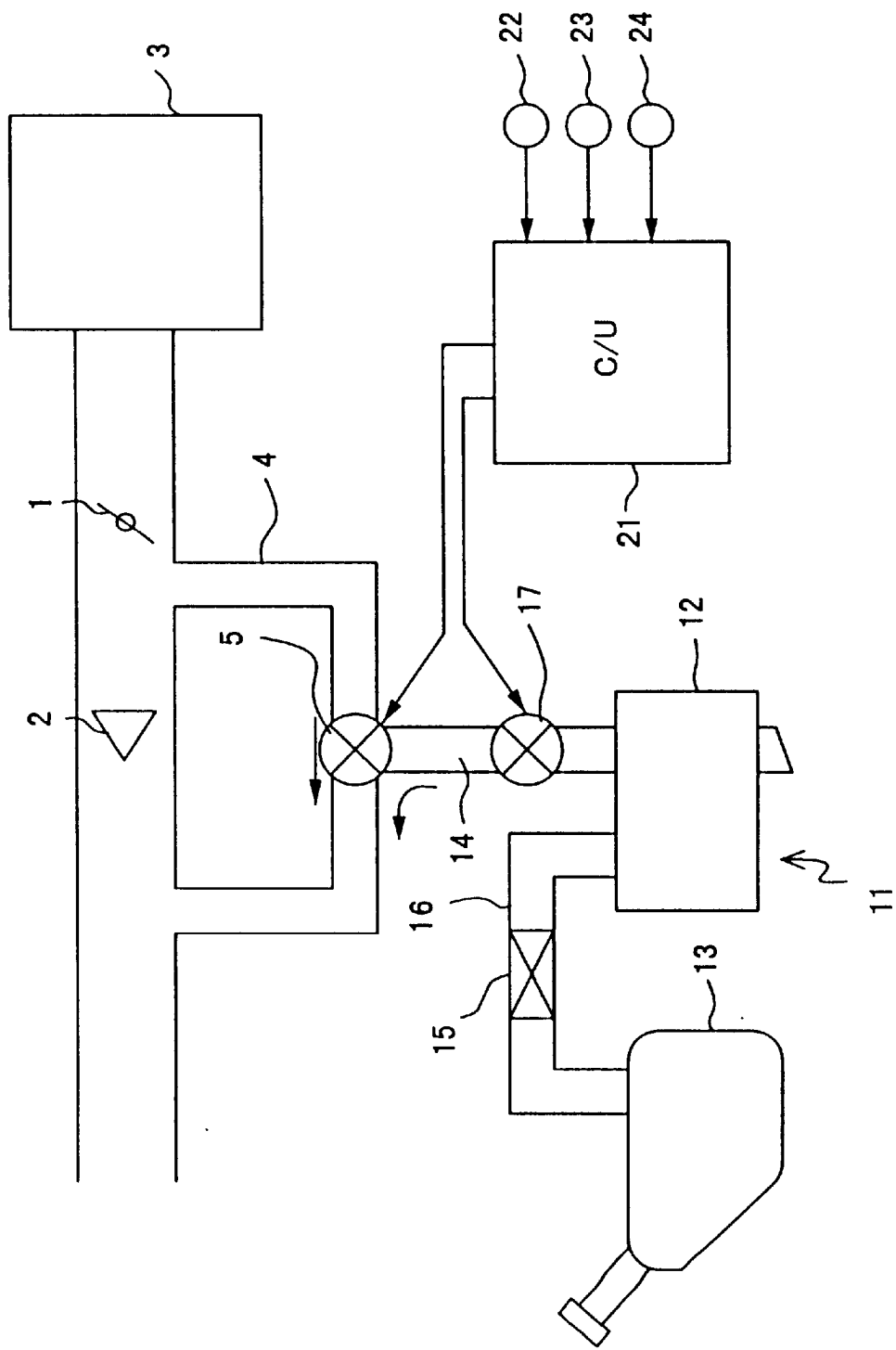
FIG. 1 is a view showing the system structure of the internal combustion engine according to the first embodiment.

FIG. 1 is a view showing a system structure of an internal combustion engine according to a first embodiment of the present invention, wherein a compressor 2 of a turbocharger working as a supercharger (turbosupercharger) is mounted on the upstream side of a throttle valve 1, and an intake air supercharged by the compressor 2 is supplied to an engine 3.

Further, a bypass passage 4 for bypassing the compressor 2 is equipped, and an electromagnetic-type three-way valve 5 is mounted on the bypass passage 4.

On the other hand, a fuel vapor processing apparatus 11 is equipped to the engine 3. The fuel vapor processing apparatus 11 adsorbs fuel vapor generated inside a fuel tank 13 by an adsorbent of activated carbon and the like filled inside a canister 12, purges the fuel adsorbed by the adsorbent and supplies the purged air to an intake passage of the engine 1 through a purge passage 14, thereby enabling combustion. The purge passage 14 is connected to the three-way valve 5.

The fuel vapor inside the fuel tank 13 is sucked into the canister 12 through a fuel vapor passage 16 equipped with a check valve 15 set to open when the pressure inside the fuel tank 13 becomes equal to or above a predetermined value.

Further, an electromagnetic-type purge control valve 17 is mounted on the purge passage 14.

The three-way valve 5 is switched so as to either communicate the upstream and downstream of the compressor 2 or communicate the purge passage 14 to the upstream side of the compressor 2. The three-way valve 5 and the purge control valve 17 are controlled by a control unit 21 equipped with a microcomputer.

Detection signals from various sensors are input to the control unit 21 for the control of the three-way valve 5 and the purge control valve 17. Sensors such as an airflow meter 22 for detecting an intake air quantity of the engine 3, a throttle sensor 23 for detecting the opening of the throttle valve 1, a rotation sensor 24 for detecting the rotation speed of the engine 3 and the like are equipped as the various sensors.

Figure 2:
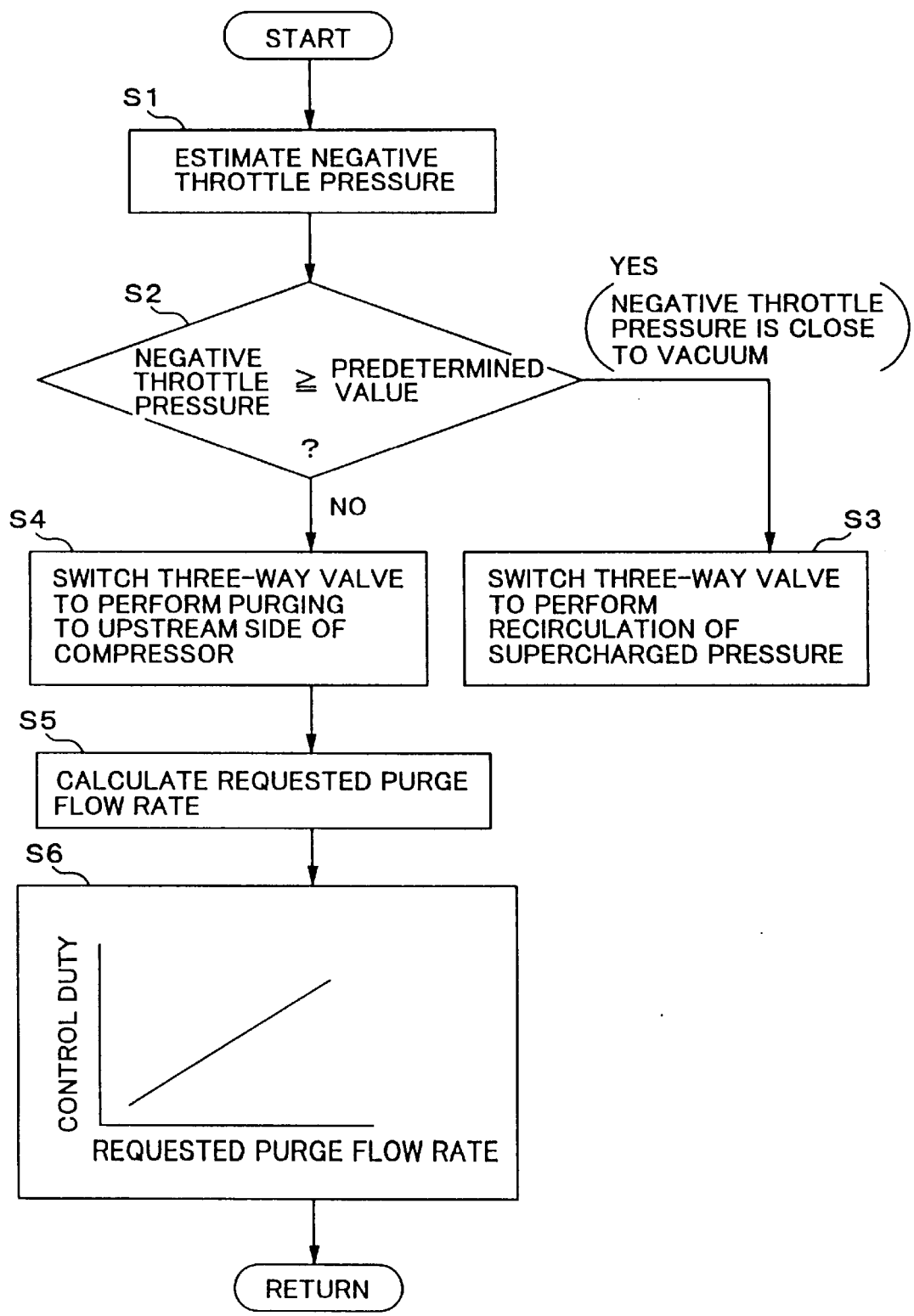
FIG. 2 is a flowchart showing the contents of control according to the first embodiment.

The control unit 21 controls the three-way valve 5 and the purge control valve 17 as shown in the flowchart of FIG. 2.

In S1, a negative throttle pressure (intake air pressure) is estimated based on the intake air quantity, the rotation speed of the engine, the throttle opening and the like.

In this step, instead of estimating the negative throttle pressure from the driving conditions of the engine 3, the negative throttle pressure may be detected directly by a pressure sensor.

In S2, determination is made on whether the negative throttle pressure gained at S1 is equal to or above a predetermined value (the intake air pressure on the downstream of the throttle is below a predetermined negative value) or not.

When the negative throttle pressure is equal to or above the predetermined value due to a rapid deceleration and the like, the procedure is advanced to S3, where the three-way valve 5 is switch controlled so as to communicate the upstream and downstream of the compressor 2 through the bypass passage 4, thereby recirculating the supercharged pressure on the downstream side of the compressor 2 to the upstream side thereof (switching device).

On the other hand, when the negative throttle pressure is below the predetermined value (when the intake air pressure on the downstream of the throttle is above the predetermined negative value), the procedure is advanced to S4, where the three-way valve 5 is switch controlled so as to communicate the purge passage 14 to the upstream side of the compressor 2 through the three way valve 5 and the bypass passage 4 (switching device). Thereby, it becomes possible to perform the canister purge even during the supercharging state, by use of the negative pressure on the upstream side of the compressor 2.

Then, in S5, a requested purge flow rate is determined according to the driving conditions, such as the intake air quantity, the rotation speed of the engine, the opening of the throttle and the like. Next, in S6, the requested purge flow rate is converted to a control duty of the purge control valve 17, and a drive signal of the duty is output to the purge control valve 17.

According to such a construction, in the condition where the recirculation of the supercharged pressure is necessary, the recirculation of the supercharged pressure is performed through the bypass passage 4. On the other hand, when there is no need for recirculation, one portion of the bypass passage 4 is used to perform the purging of the canister, thereby simplifying the piping arrangement necessary for the recirculation system and the fuel vapor processing apparatus.

FIG. 3 shows a system structure according to a second embodiment, and the elements which are the same as the ones in FIG. 1 are provided with the same reference numerals.

According to the second embodiment shown in FIG. 3, a second purge passage 14a is equipped, which branches from the purge passage 14 between the three-way valve 5 and the purge control valve 17, and is communicated to the intake passage at the downstream side of the throttle valve 1 (negative pressure generation mechanism). Further, a check valve 18 is mounted on the second purge passage 14a, which allows only the direction of flow from the canister 12 toward the intake passage.

According to such a structure, the control unit 21 controls the three-way valve 5 and the purge control valve 17 as shown in the flowchart of FIG. 4.

In S11, the negative throttle pressure is either estimated or detected by a sensor.

In S12, determination is made on whether the negative throttle pressure is equal to or above a predetermined value or not, and when the negative throttle pressure is equal to or above a predetermined value, the procedure is advanced to S13, where the three-way valve 5 is switch controlled so as to communicate the upstream side and downstream side of the compressor 2 through the bypass passage 4.

Then, in S14, the requested purge flow rate is determined, and in S15, the control duty of the purge control valve 17 is determined and output so as to perform the purging of the canister by the requested purge flow rate through the second purge passage 14a.

Accordingly, the purging of the canister may be performed during the recirculation of the supercharged pressure, by use of the negative throttle pressure.

On the other hand, when the negative throttle pressure is determined to be below the predetermined value in S12, then the procedure is advanced to S16, where the three-way valve 5 is switch controlled so as to communicate the purge passage 14 to the upstream side of the compressor 2 through the bypass passage 4.

Then, the requested purge flow rate is calculated in S17, and in S18, the control duty of the purge control valve 17 is determined and output so as to perform the purging of the canister to the upstream side of the compressor 2 through the purge passage 14 and the bypass passage 4.

When the apparatus adopts the structure to perform the purging of the canister to the upstream side of the compressor 2, the purging may be performed even while supercharging, using the negative pressure on the upstream side of the compressor 2.

According to the first and second embodiments, the switching of the three-way valve 5 was controlled electronically. However, the three-way valve may also be driven to switch mechanically by a diaphragm, by introducing the negative throttle pressure (intake air pressure) to the diaphragm. In this case, the determination of the negative throttle pressure in the flowcharts of FIG. 2 and FIG. 4 and the switching control of the three-way valve 5 based on the determined result should be omitted.

Further, a mechanical supercharger may be used other than the turbocharger.

Moreover, the compressor may be equipped on the downstream side of the throttle valve. In such a structure, the opening and closing of the bypass passage 4 may preferably be controlled according to the supercharged pressure (intake air pressure) on the downstream side of the compressor.

What we claimed are:

1. A fuel vapor processing apparatus in an internal combustion engine equipped with a supercharger, in which supercharging is performed by said supercharger equipped with a recirculation system for circulating a supercharged pressure on the downstream side of a compressor to the upstream side thereof through a bypass passage, comprising:

a canister for adsorbing fuel vapor being generated in a fuel tank;

a three-way valve mounted in the middle of said bypass passage;

a purge passage led out from said canister and connected to said three-way valve;

a switching means for switching said three-way valve between a state for communicating said bypass passage, and a state for communicating said purge passage to the upstream side of said compressor through said bypass passage; and a second purge passage branching from the middle of said purge passage, and being communicated to the downstream side of a negative pressure generation mechanism equipped on the downstream side of said compressor.

2. A fuel vapor processing apparatus of an internal combustion engine equipped with a supercharger according to claim 1, wherein said switching means controls to switch said three-way valve to communicate said bypass passage only when the recirculation of said supercharged pressure is requested.

3. A fuel vapor processing apparatus of an internal combustion engine equipped with a supercharger according to claim 1, wherein said switching means operates said three-way valve to switch mechanically according to an intake air pressure of said internal combustion engine, using said intake air pressure as a driving source.

4. A fuel vapor processing apparatus of an internal combustion engine equipped with a supercharger according to claim 1, wherein said three-way valve is an electromagnetic-type three-way valve, and said switching means controls said three-way valve electronically based on the data of an intake air pressure.

5. A fuel vapor processing apparatus of an internal combustion engine equipped with a supercharger according to claim 1, wherein a check valve is mounted on said second purge passage for allowing only the direction of flow from said canister toward the downstream side of said negative pressure generation mechanism.

6. A fuel vapor processing apparatus of an internal combustion engine equipped with a supercharger according to claim 1, wherein said negative pressure generation mechanism is a throttle valve.

7. A fuel vapor processing apparatus in an internal combustion engine equipped with a supercharger, in which supercharging is performed by said supercharger equipped with a recirculation system for circulating a supercharged pressure on the downstream side of a compressor to the upstream side thereof through a bypass passage, comprising:

a canister for adsorbing fuel vapor being generated in a fuel tank;

a three-way valve mounted in the middle of said bypass passage;

a purge passage led out from said canister and connected to said three-way valve; and a switching means for switching said three-way valve between a state for communicating said bypass passage and a state for communicating said purge passage to the upstream side of said compressor through said bypass passage.

8. A fuel vapor processing apparatus of an internal combustion engine equipped with a supercharger according to claim 1, wherein said switching means controls to switch said three-way valve to communicate said bypass passage only when the recirculation of said supercharged pressure is requested.

9. A fuel vapor processing apparatus of an internal combustion engine equipped with a supercharger according to claim 1, wherein said switching means operates said three-way valve to switch mechanically according to an intake air pressure of said internal combustion engine, using said intake air pressure as a driving source.

10. A fuel vapor processing apparatus of an internal combustion engine equipped with a supercharger according to claim 1, wherein said three-way valve is an electromagnetic-type three-way valve, and said switching means controls said three-way valve electronically based on the data of an intake air pressure.

* * * * *